US008380075B2

(12) United States Patent
Sakigawa et al.

(10) Patent No.: US 8,380,075 B2
(45) Date of Patent: Feb. 19, 2013

(54) OPTICAL TRANSCEIVER MODULE (75) Inventors: Yukio Sakigawa, Fujisawa (JP);
Toshiaki Takai, Yokohama (JP); Shohei Hata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 441 days.

(21) Appl. No.: 12/624,470

(22) Filed: Nov. 24, 2009

(65) Prior Publication Data

US 2010/0209103 A1    Aug. 19, 2010

(30) Foreign Application Priority Data

Feb. 13, 2009    (JP) ................................. 2009-030638

(51) Int. Cl.
*H04B 10/00*    (2006.01)
(52) U.S. Cl. .................. 398/138; 398/135; 398/128
(58) Field of Classification Search .......... 398/135–139; 385/88–94
See application file for complete search history.

(56) References Cited

U.S. PATENT DOCUMENTS

| | | | | |
|---|---|---|---|---|
| 5,291,571 A * | 3/1994 | Kunikane et al. | ............... | 385/93 |
| 5,416,624 A * | 5/1995 | Karstensen | ................... | 398/139 |
| 5,479,540 A * | 12/1995 | Boudreau et al. | ............... | 385/14 |
| 5,537,503 A * | 7/1996 | Tojo et al. | ........................ | 385/93 |
| 5,631,987 A * | 5/1997 | Lasky et al. | ..................... | 385/88 |
| 5,937,122 A * | 8/1999 | Ohki et al. | ........................ | 385/78 |
| 6,130,444 A * | 10/2000 | Hashizume et al. | ............. | 257/81 |
| 6,254,284 B1 * | 7/2001 | Yoshimoto et al. | ............. | 385/88 |
| 6,353,491 B1 * | 3/2002 | Tanaka et al. | .................. | 398/139 |
| 6,433,942 B1 * | 8/2002 | Memezawa et al. | .......... | 359/833 |
| 6,454,467 B1 * | 9/2002 | Ishihara et al. | ................. | 385/88 |
| 6,621,067 B2 * | 9/2003 | He et al. | ........................ | 250/225 |
| 6,695,492 B2 * | 2/2004 | Ide et al. | .......................... | 385/88 |
| 6,718,091 B2 * | 4/2004 | Ishihara et al. | ................. | 385/36 |
| 6,769,816 B2 * | 8/2004 | Capewell et al. | ............... | 385/89 |
| 6,792,181 B2 * | 9/2004 | Sasaki | .............. | 385/37 |
| 6,810,175 B1 * | 10/2004 | Wey et al. | ....................... | 385/28 |
| 6,865,346 B1 * | 3/2005 | Miller et al. | .................. | 398/135 |
| 6,872,009 B2 * | 3/2005 | Wisecarver | ..................... | 385/92 |
| 6,925,256 B1 * | 8/2005 | Heiney | .............. | 398/42 |
| 6,991,382 B2 * | 1/2006 | Scruggs et al. | ................. | 385/92 |
| 7,011,455 B2 * | 3/2006 | Luo et al. | ........................ | 385/88 |
| 7,044,648 B1 * | 5/2006 | Barbarossa et al. | ............ | 385/61 |
| 7,093,988 B2 * | 8/2006 | Tsumori | ......................... | 385/93 |
| 7,101,089 B2 * | 9/2006 | Sohmura et al. | ................ | 385/88 |
| 7,158,700 B2 * | 1/2007 | Duncan et al. | ................. | 385/31 |
| 7,200,335 B2 * | 4/2007 | Tsumori et al. | ............... | 398/135 |
| 7,212,714 B2 * | 5/2007 | Wisecarver | ..................... | 385/52 |

(Continued)

FOREIGN PATENT DOCUMENTS

JP    61-103110 A    5/1986

*Primary Examiner* — Agustin Bello
(74) *Attorney, Agent, or Firm* — Mattingly & Malur, PC (57) ABSTRACT There are provided a downsized and low-cost optical module used as a terminal for wavelength multiplexing optical transmission and one-core bidirectional optical transmission which transmits lights of plural wavelengths through one optical fiber, and a method of manufacturing the optical module. A base on which plural optical elements are mounted, and an optical multiplexer and demultiplexer having wavelength selection filters and mirrors formed on both surfaces of a substrate are prepared. Those two parts are packed into a package so that an optical element mounted surface and a filter surface are substantially parallel to each other, and the optical elements are arranged to emit or receive lights obliquely to the base. With this configuration, because the optical multiplexer and demultiplexer can be mounted in parallel to an X-Y plane, a package can be easily machined by using a lathe, thereby enabling a reduction in the costs.

6 Claims, 9 Drawing Sheets

U.S. PATENT DOCUMENTS

| | | | | |
|---|---|---|---|---|
| 7,244,069 B2* | 7/2007 | Nakanishi et al. | | 385/93 |
| 7,309,169 B2* | 12/2007 | Toillon et al. | | 385/88 |
| 7,352,935 B2* | 4/2008 | Furuyama et al. | | 385/52 |
| 7,543,999 B2* | 6/2009 | Winter et al. | | 385/93 |
| 7,585,120 B2* | 9/2009 | Ito et al. | | 385/93 |
| 7,613,372 B2* | 11/2009 | Luo et al. | | 385/33 |
| 7,625,136 B2* | 12/2009 | Miyamae et al. | | 385/92 |
| 7,654,750 B2* | 2/2010 | Brenner et al. | | 385/89 |
| RE41,742 E* | 9/2010 | Furuyama et al. | | 385/52 |
| 7,957,616 B2* | 6/2011 | Sakurai et al. | | 385/39 |
| 8,005,367 B2* | 8/2011 | Nakanishi et al. | | 398/138 |
| 8,118,498 B2* | 2/2012 | Sasada et al. | | 385/93 |
| 8,121,484 B2* | 2/2012 | Kihara et al. | | 398/85 |
| 2003/0002822 A1* | 1/2003 | Ishihara et al. | | 385/88 |
| 2003/0016920 A1* | 1/2003 | Sohmura et al. | | 385/88 |
| 2003/0047674 A1* | 3/2003 | Thornburn et al. | | 250/231.13 |
| 2003/0048511 A1* | 3/2003 | Tsumori et al. | | 359/152 |
| 2003/0128916 A1* | 7/2003 | Sasaki | | 385/24 |
| 2003/0147601 A1* | 8/2003 | Bartur et al. | | 385/92 |
| 2004/0042736 A1* | 3/2004 | Capewell et al. | | 385/89 |
| 2004/0151442 A1* | 8/2004 | Scruggs et al. | | 385/92 |
| 2006/0039658 A1* | 2/2006 | Furuyama et al. | | 385/90 |
| 2006/0088253 A1* | 4/2006 | Furuta et al. | | 385/89 |
| 2006/0193568 A1* | 8/2006 | Ito et al. | | 385/93 |
| 2009/0263087 A1* | 10/2009 | Oshima et al. | | 385/88 |
| 2010/0209103 A1* | 8/2010 | Sakigawa et al. | | 398/45 |
| 2010/0226655 A1* | 9/2010 | Kim | | 398/139 |
| 2010/0247043 A1* | 9/2010 | Sugawara et al. | | 385/93 |
| 2010/0278482 A1* | 11/2010 | Adachi et al. | | 385/33 |
| 2011/0026919 A1* | 2/2011 | Schunk | | 398/41 |

* cited by examiner

FFP (Far Field Pattern)

OPTICAL TRANSCEIVER MODULE

BACKGROUND OF THE INVENTION (1) Field of the Invention

The present invention relates to an optical module, and more particularly to a multiwavelength optical transmitter module that multiplexes and transmits lights of plural wavelengths, and a multiwavelength optical receiver module that demultiplexes and receives a light obtained by multiplexing the plural wavelengths.

(2) Description of the Related Art

In the recent information communication field, a communication traffic that reciprocates large volumes of data at a high speed by the aid of lights is rapidly improved. In particular, broadbandization of an access line associated with an explosive spread of the Internet is accelerated, and the remarkable rising of an FTTH (fiber to the home) service on the market has been found. Among the optical transmission systems of the FTTH, a PON (passive optical network) system in which plural subscribers share one optical fiber is now growing in demand. In that system, data that has been transmitted from a central office through one optical fiber is split into 32 optical fibers from 16 optical fibers by a splitter, and distributed to respective subscriber homes. This makes it possible to remarkably reduce the optical fiber laying costs. Also, an ONU (optical network unit) is laid on each subscriber side as a terminal device, and a downlink signal (wavelength 1.5 μm) to each subscriber side from the central office and an uplink signal (wavelength 1.3 μm) to the central office from the subscriber side are subjected to wavelength division multiplexing (WDM) to transmit the uplink and downlink signals by the aid of the same optical fiber. Further, a three-wavelength bidirectional optical module is located within the ONU, which is basically made up of a light emitting element (LD: laser diode) for transmission of the uplink signal, a light receiving element (PD: photo detector) for reception of the downlink signal, and a WDM filter that separates the uplink and downlink signals from each other.

Figure 1:
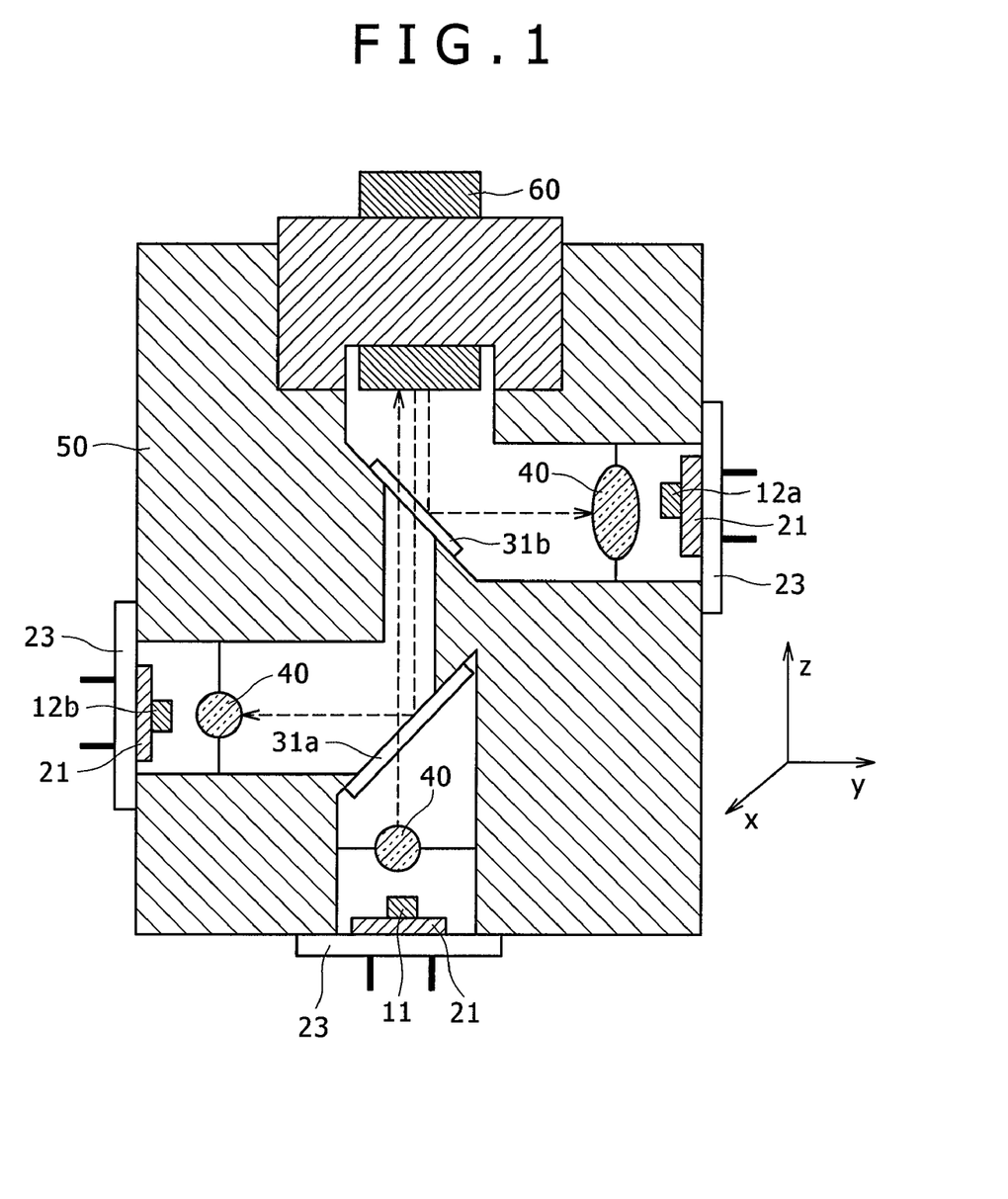
FIG. 1 is a basic configuration diagram showing a BIDI module according to a first system of a conventional module.

A conventional module system is shown in FIG. 1. FIG. 1 shows a basic configuration of a single-core bidirectional (BIDI: bidirectional) module where the respective optical parts of a light emitting element 11, light receiving elements 12a and 12b, and wavelength selection filters 31a, 31b are spatially arranged within a package 50. In this system, because the respective optical parts can be fabricated independently, the fabrication yield can be easily ensured. Also, an optical link is enabled by so-called active alignment that optically axially adjusts the optical elements 11, 12a, and 12b each packed into a CAN package having a lens 40 integrated therein to an optical fiber 60 while operating the optical elements 11, 12a, and 12b. This leads to the advantage that stable optical coupling efficiency is obtained. On the other hand, the number of parts is larger. In addition, because the wavelength selection filters 31a and 31b are mounted obliquely with respect to end surfaces of a package 50, there is a need to process the package 50 to be at a desired angle with respect to a Z-axis shown in FIG. 1. This causes a drawback that is disadvantageous for a reduction in the size and costs.

In order to achieve both of the extendability of the wavelength and the reduction in the size and costs, there is a need to form the wavelength multiplexer and demultiplexer in a compact space. For provision of the compact wavelength multiplexer and demultiplexer, there is a method of mounting plural filter units on a common parallelogram prism or another optical block. For example, in a multiplexing device disclosed in JP-A-Sho-61-103110, a plurality of optical filters split lights different in wavelength, which have propagated through a common optical waveguide. The multiplexing device has a multiplexer and a demultiplexer in which wavelength selection filters and mirrors are fixed at given positions of a transparent substrate so as to transmit lights of predetermined wavelengths and reflect lights of other wavelengths, respectively. The wavelength selection filters and the mirrors are arranged in such a manner that an incoming light is input to the transparent substrate, and sequentially partially transmitted and partially reflected by the respective wavelength selection filters and the mirrors disposed on a surface of the substrate to form a zigzag optical path. A light of a specific wavelength is removed or added by each of the filters. However, this multiplexing device is configured so that the optical elements and the optical multiplexer and demultiplexer are coupled with each other through rod lenses or optical fibers, which makes a reduction in the size difficult and the number of parts large.

As described above, the related art is large in the number of parts, and large in the number of processes for mounting the optical parts including mounting of the optical elements. Also, for the purpose of mounting the wavelength selection filters obliquely with respect to the end surface of the package, there is a need to machine the package so as to be at the desired angle with respect to the Z-axis shown in FIG. 1. Therefore, because the processing is difficult and the costs are high, there is a limit to the reduction in the size and costs.

SUMMARY OF THE INVENTION

Under the above circumstances, an object of the present invention is to provide an optical module used as a terminal for wavelength multiplexing optical transmission or one-core bidirectional optical transmission, for transmitting lights of plural wavelengths through one optical fiber, which remarkably reduces the number of parts and the number of mounting processes to reduce the size and the costs while keeping the low-loss optical characteristics and the high reliability.

According to the present invention, in order to solve the above problems, a base on which a plurality of light emitting elements and a plurality of light receiving elements are mounted, and a wavelength multiplexer and demultiplexer having wavelength selection filters and mirrors mounted on front and rear surfaces of a substrate are prepared, and those two parts are packed into a package in such a manner that an optical element mounted surface and filter surfaces are angled to be nonparallel to each other while those two parts are substantially parallel to each other. For that reason, the base has a slope for mounting a substrate on which the light emitting elements are mounted and a substrate on which the light receiving elements are mounted in nonparallel to the base. Alternatively, for the purpose of mounting the substrate on which the light emitting elements are mounted and the substrate on which the light receiving elements are mounted in nonparallel to the base, there is provided a hemispherical pedestal on which the substrates are mounted, and the base has a recess having the same radius of curvature as that of the pedestal for mounting the pedestal therein. In addition, a substrate having a pair of parallel opposed surfaces and a desired thickness and made of a transparent material to a light wavelength is provided as a support substrate, and at least one kind of wavelength selection filter is disposed on one of the pair of parallel surfaces, and a mirror for reflecting lights of wavelengths not selected by a first filter is disposed on another surface. In this situation, each of the filter and the mirror has a window for inputting and outputting the light.

The optical multiplexer and demultiplexer is fixed within the package so as to be substantially parallel to the base.

According to the present invention, there is provided an optical module that remarkably reduces the number of parts and the number of mounting processes to reduce the size and the costs for use in a multiwavelength transmitter module and a multiwavelength receiver module for transferring lights of plural wavelengths by one optical axis.

BRIEF DESCRIPTION OF THE DRAWINGS

Embodiments of the present invention will be described in detail based on the following figures, wherein.

DETAILED DESCRIPTION OF THE PREFERRED EMBODIMENTS

Hereinafter, a description will be given of embodiments of the present invention with reference to the accompanying drawings. The substantially same parts are denoted by identical reference numerals, and duplex description will be omitted.

First Embodiment

Figure 2:
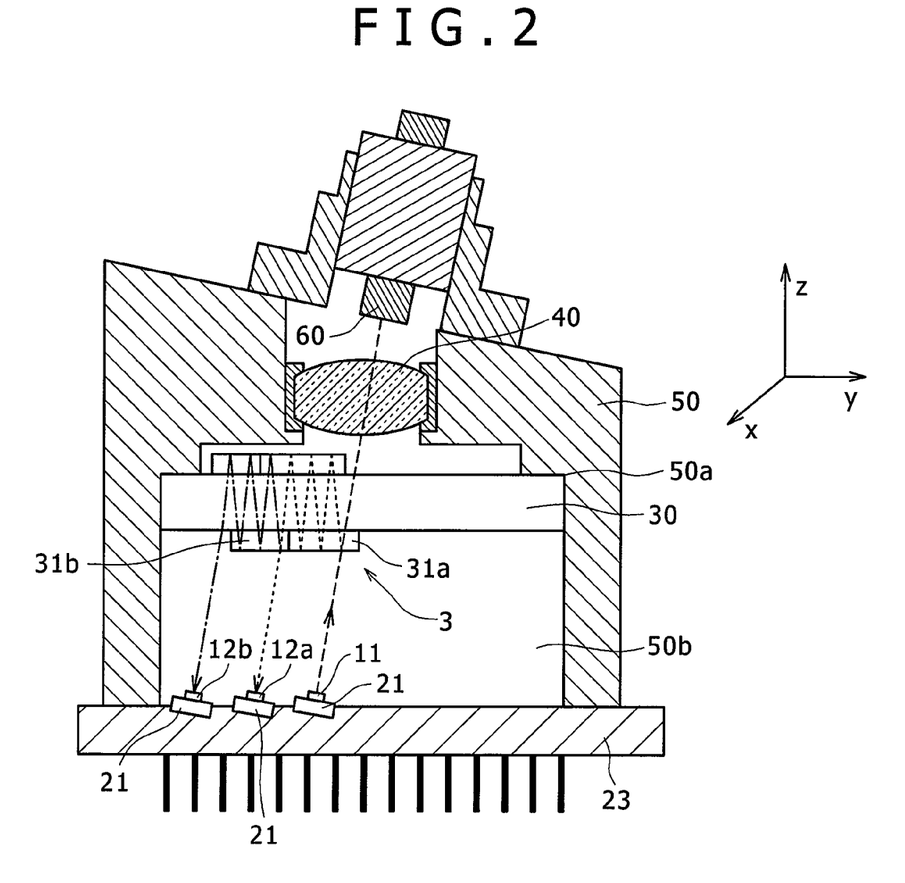
FIG. 2 is a cross-sectional view showing a three-wavelength bidirectional optical transceiver module according to an embodiment of the present invention.

A first embodiment will be described with reference to FIG. 2. FIG. 2 is a cross-sectional view showing an example in which the present invention is applied to a three-wavelength bidirectional optical transceiver module having such a function that a light of a first wavelength output from the light emitting element is coupled to an optical fiber and transmitted therethrough, and a light of a second wavelength and a light of a third wavelength are separated in wavelength from a light multiplexed in wavelength and output from the optical fiber, and guided to and received by corresponding light receiving elements, respectively.

A package (housing) 50 has a lens 40 and an optical multiplexer and demultiplexer 3 therein, and is attached with a base 23 having a light emitting element 11 and light receiving elements 12 (12a and 12b). Also, the package 50 is attached to an optical fiber 60.

The light emitting element 11 and light receiving elements 12a, 12b are adhered to substrates 21 by soldering, respectively. The substrates 21 on which the light emitting element 11 and the light receiving elements 12 are mounted, respectively, are mounted on the base 23 by Ag paste. In this situation, the substrates 21 are mounted by adjusting angles of the element mounted surfaces of the substrates 21 so that the outgoing direction of the light emitting element 11, or the incoming directions to the light receiving elements 12a and 12b from the optical fiber 60 are angled to enable the light refracted by the optical multiplexer and demultiplexer 3 packed in the package 50 in parallel to the base 23 to be optically coupled to the optical fiber. As a result, the light emitting element 11 can output the light obliquely to the base 23, and the light receiving elements can efficiently receive the light from the oblique direction. In the present specification, "the oblique direction" means a direction with an angle of 15° or more with respect to the normal direction of a main surface of the base 23. It is assumed that the wavelength of the light emitting element 11 is 1330 nm, and the wavelengths of the lights input to the light receiving elements 12a and 12b are 1550 nm and 1490 nm, respectively.

Figure 3:
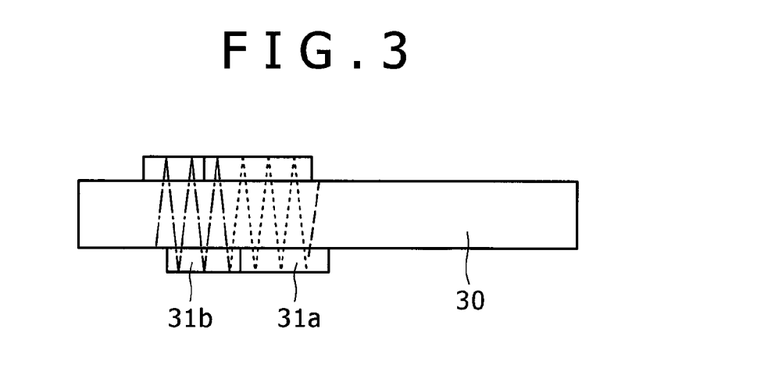
FIG. 3 is a cross-sectional view showing an optical multiplexer and demultiplexer of the three-wavelength bidirectional optical transceiver module according to the embodiment of the present invention.
Figure 4:
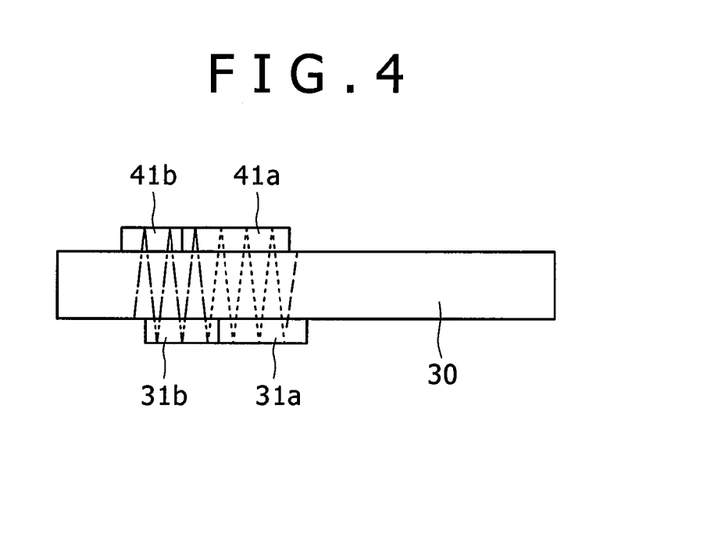
FIG. 4 is a cross-sectional view showing the optical multiplexer and demultiplexer of the three-wavelength bidirectional optical transceiver module according to the embodiment of the present invention.

The optical multiplexer and demultiplexer 3 has a transparent substrate 30 as a support substrate, and on one surface of the transparent substrate 30 are formed a first wavelength selection filter 31a and a second wavelength selection filter 31b adjacently to each other. On another surface opposing that surface in parallel are formed the wavelength selection filter 31a being a first mirror and the wavelength selection filter 31b being a second mirror. The first wavelength selection filter 31a and the second wavelength selection filter 31b each transmit lights of wavelengths in a specific range, and reflect lights of other wavelengths. The first wavelength selection filter 31a and the second wavelength selection filter 31b are each designed to transmit lights having a different range of wavelengths. A material of the transparent substrate 30 needs to be transparent to the wavelength in use, but may not be particularly limited. However, a material that is inexpensive and high in processing precision is desirable (for example, amorphous glass, sapphire crystal, crystal quartz, silicon, or the like). In this embodiment, BK7 is used as the transparent substrate 30. The optical multiplexer and demultiplexer 3 in the first embodiment is shown in FIGS. 3 and 4. In this embodiment, as shown in FIG. 3, the wavelength selection filters 31a and 31b are adjacently formed on the transparent substrate 30, and light reflection is repeated between the wavelength selection filters 31a and 31b opposing each other through the transparent substrate 30. The light goes along a zigzag optical path shown in FIG. 3, and is then demultiplexed. Alternatively, as shown in FIG. 4, it is possible to manufacture the optical multiplexer and demultiplexer 3 by arranging, at a position facing the wavelength selection filter 31a, a mirror 41a that transmits the light transmitted by the wavelength selection filter 31a, and reflects the light reflected by the wavelength filter 31a.

The wavelength selection filters 31a and 31b are each formed of a dielectric multilayer film made of $Ta_2O_5$ and $SiO_2$, and each transmit the light of a specific wavelength and reflect the lights of other wavelengths. The filter 31a is formed of a filter (so-called "band pass filter") having a property that transmits a light of 1330 nm, that is, a light emitted from the light emitting element 11, and reflects lights of 1490 nm and 1550 nm. The filter 31b is formed of a band pass filter having a property that transmits a light of 1490 nm, that is, a light received by the light receiving element 12a, and reflects a light of 1550 nm.

The optical multiplexer and demultiplexer 3 is packed into the package 50 in such a manner that the outline of the optical multiplexer and demultiplexer 3 is fitted to a recess 50b formed in the package 50 by a turning process, and adhered to the package 50 with a UV curable resin. A joint surface of the package 50 with the optical multiplexer and demultiplexer 3 is machined to be parallel to the base 23. In the related art shown in FIG. 1, the joint surfaces of the wavelength selection filters 31a, 31b and the package 50 are each machined to be at a desired angle with respect to the base 23. The above complicated configuration is difficult to form by a lathe, and is generally formed by an electric spark machining. For that reason, it is difficult to reduce the costs of the package. In this embodiment, however, the recess (through-hole) 50b is formed by the turning process or the like, to thereby easily form a planar step 50a orthogonal to a depth direction of the recess 50b (a direction along a wall surface of the recess 50b). The optical multiplexer and demultiplexer 3 can be optically coupled with the optical elements by orienting the plane of the optical multiplexer and demultiplexer 3 with the step 50a as the joint surface for mounting. A surface of the package 50 to which the base 23 is fitted is orthogonal to a depth direction of the recess 50b. With the above configuration, it is possible to realize a reduction in the costs because of the configuration easily machinable by a lathe.

Likewise, the lens 40 for condensing the outgoing light (1330 nm) from the light emitting element 11 and inputting the condensed light to the optical fiber 60 is adhered to the package 50 with the UV curable resin. Similarly, the light (1490 nm and 1550 nm) output from the optical fiber 60 is condensed by the lens 40 and then input to the optical multiplexer and demultiplexer 3.

The package 50 to which the optical multiplexer and demultiplexer 3 and the lens 40 are adhered, the base 23 on which the light emitting element 11 and the light receiving elements 12a, 12b are mounted, and the optical fiber 60, that is, three optical parts are held with a positional relationship that allows the maximum optical coupling to be obtained by active alignment. Therefore, those three optical parts are fixed by YAG welding.

In the optical transceiver module fabricated as described above, the optical elements and the optical fiber 60 transmit and receive light as described below. After a light of 1330 nm output from the light emitting element 11 has arrived at the optical multiplexer and demultiplexer 3, the light passes through the wavelength selection filter 31a, and arrives at the transparent substrate 30. The optical multiplexer and demultiplexer 3 is mounted at an angle nonperpendicular to the optical axis. Therefore, after the light has been subjected to a given refraction determined by a refractive index difference (Snell's law), the light is output from the optical multiplexer and demultiplexer 3, and input to the optical fiber 60 through the lens 40. Also, lights of 1490 nm and 1550 nm output from the optical fiber 60 arrive at the optical multiplexer and demultiplexer 3 through the lens 40, and are refracted by the optical multiplexer and demultiplexer 3. Thereafter, the lights propagate within the optical multiplexer and demultiplexer 3, and are reflected by the wavelength selection filter 31a functioning as a mirror. The reflected lights are again reflected by the wavelength selection filter 31a located at the opposed surface, and the reflection is repeated. Then, only the light of 1490 nm is transmitted by the wavelength selection filter 31b, and input to the light receiving element 12a accepting 1490 nm. On the other hand, the light of 1550 nm is again reflected by the wavelength selection filter 31b, and also reflected by the wavelength selection filter 31b located on the opposed surface, and the reflection is repeated. Then, the light of 1550 nm is input to the light receiving element 12b from a portion of the optical multiplexer and demultiplexer 3 where no wavelength selection filter 31b is formed.

In this embodiment, a vertically emitting LD having the microlens integrated therein is used as the light emitting element 11. Alternatively, a surface emitting LD may be used. However, the vertically emitting LD is more preferable because of ease of mounting.

Also, in this embodiment, the recess of the package 50 in which the optical multiplexer and demultiplexer 3 is mounted is formed by using a lathe, but a device other than a lathe may be used.

Also, in this embodiment, the three-wavelength capable optical module in which one light emitting element and two light receiving elements are arranged inside of the same package is exemplified. However, the present invention is not limited to or by the above configuration, and it is needless to say that the present invention is applicable to an optical module in which plural optical elements (light emitting elements, light receiving elements, and the like) are arranged within the same package.

Second Embodiment

Figure 5:
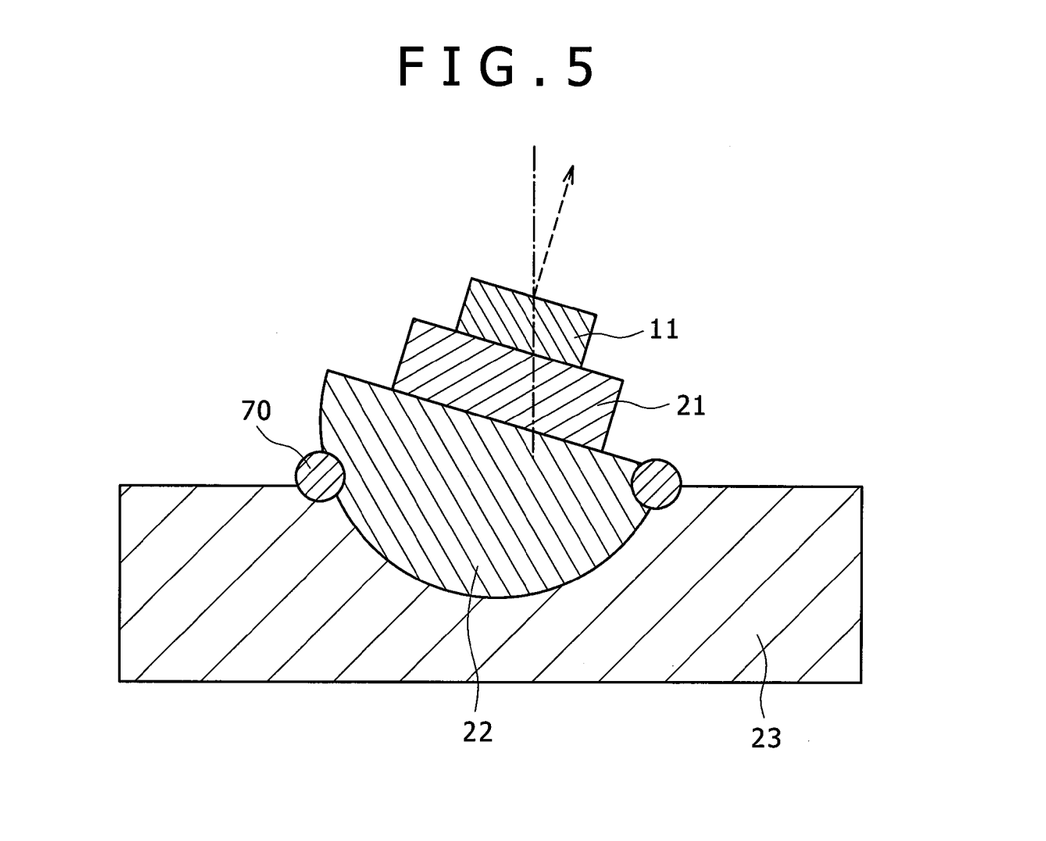
FIG. 5 is a cross-sectional view showing a light emitting element mounted portion according to the embodiment of an present invention.

FIGS. 5 to 10 are diagrams for explaining a second embodiment. FIG. 5 is a diagram enlarging a portion where the light emitting element 11 is mounted on the base 23 in the optical transceiver module having a hemispherical recess formed in a portion on which the light emitting element and the light receiving element are mounted, in the first embodiment.

A procedure of adjusting the outgoing direction is shown in FIGS. 6A to 6E.

Figure 6A:
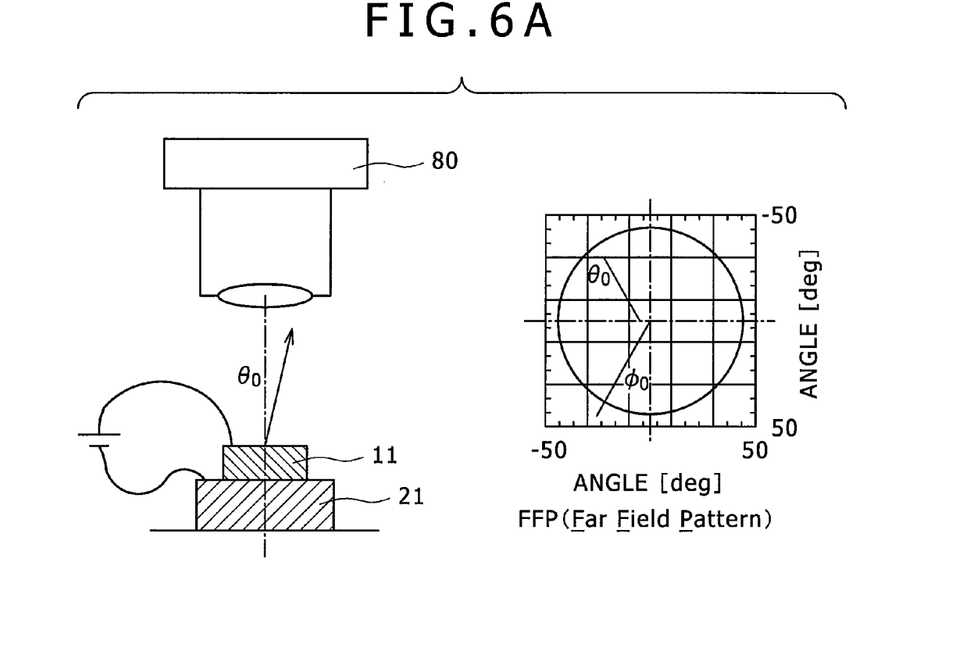
FIG. 6A is a diagram showing a procedure of adjusting an outgoing direction of a light emitting element using a pedestal for mounting the light emitting element according to the embodiment of the present invention.

First, as shown in FIG. 6A, an FFP (far field pattern) of the light emitting element 11 that is mounted on the substrate 21 by soldering is measured by an FFP measuring unit 80 to specify an outgoing direction $(\theta_0, \phi_0)$.

Figure 6B:
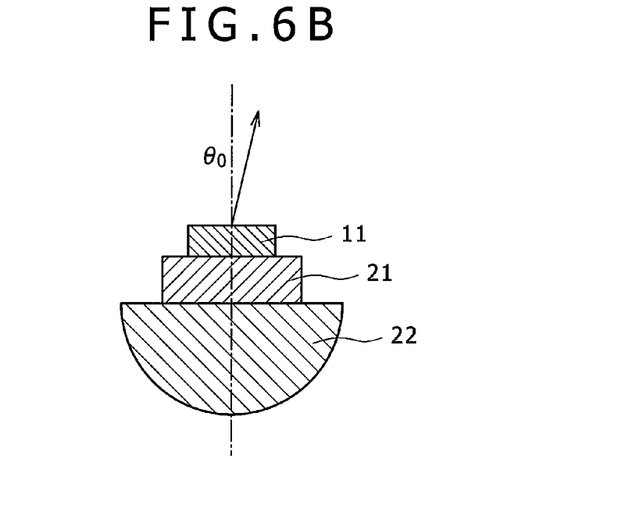
FIG. 6B is a diagram showing a procedure of adjusting the outgoing direction of the light emitting element using the pedestal for mounting the light emitting element according to the embodiment of the present invention.

Subsequently, as shown in FIG. 6B, the substrate 21 is adhered to the hemispherical pedestal 22 by Ag paste or soldering.

Figure 6C:
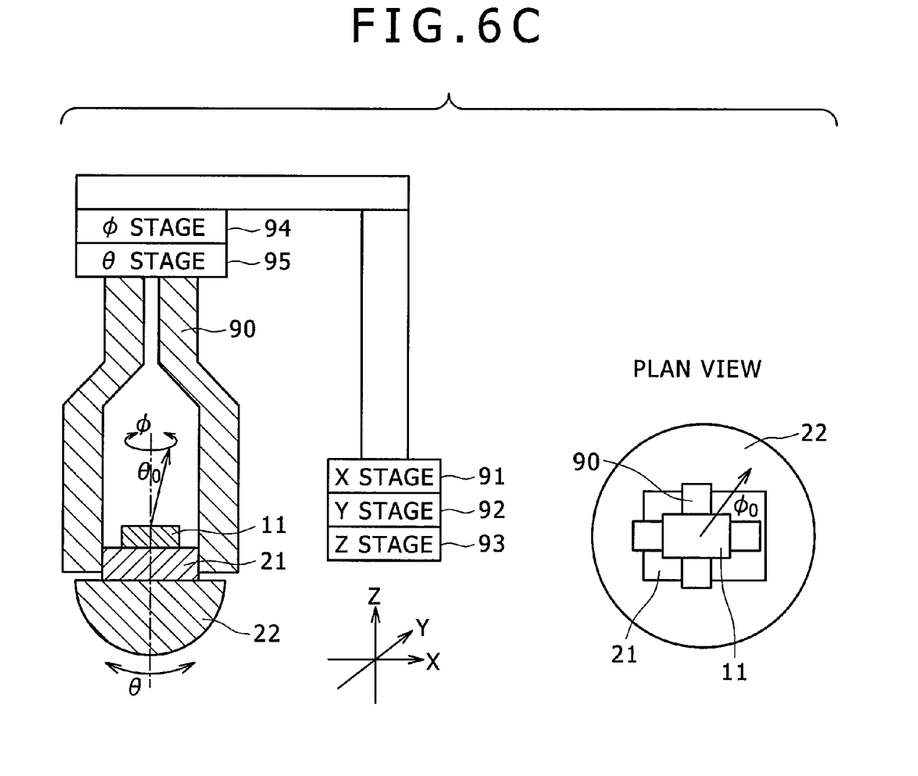
FIG. 6C is a diagram showing a procedure of adjusting the outgoing direction of the light emitting element using the pedestal for mounting the light emitting element according to the embodiment of the present invention.

Then, as shown in FIG. 6C, the substrate 21 is grasped by a manipulator 90 having stages 94 and 95 movable in directions θ and φ, and stages 91, 92, and 93 movable in directions X, Y, and Z. The substrate 21 is corrected by the outgoing direction $(\theta_0, \phi_0)$ obtained by the FFP, and thereafter adjusted to a given direction $(\alpha, 0)$. Then, the X and Y stages are operated while the angle is held so that the substrate 21 moves over the recess of the base 23, the recess having the same radius of curvature as that of the pedestal 22.

Figure 6D:
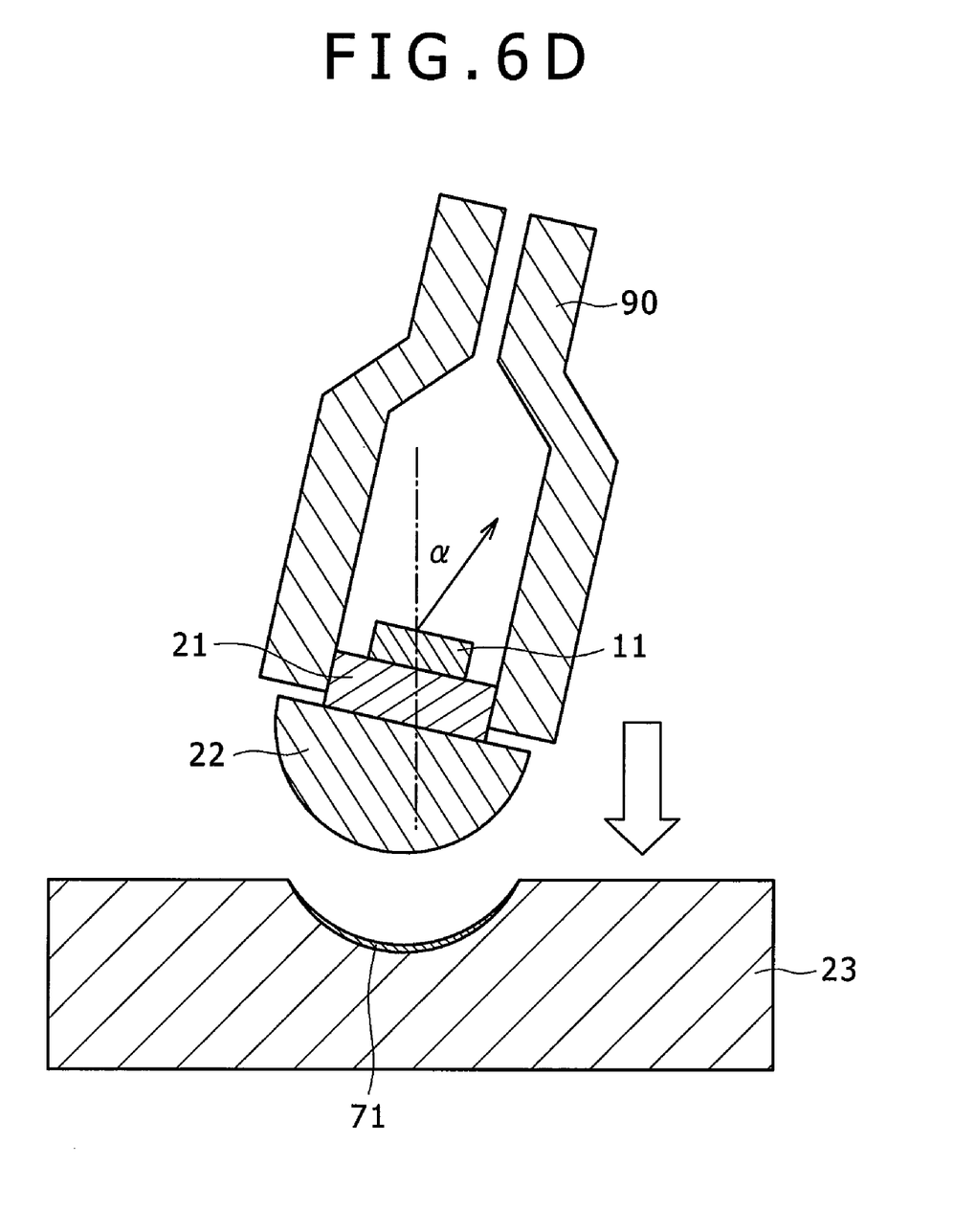
FIG. 6D is a diagram showing a procedure of adjusting the outgoing direction of the light emitting element using the pedestal for mounting the light emitting element according to the embodiment of the present invention.

Then, as shown in FIG. 6D, the Z stage is operated so that the pedestal 22 is mounted on the recess coated with an Ag paste 71.

Figure 6E:
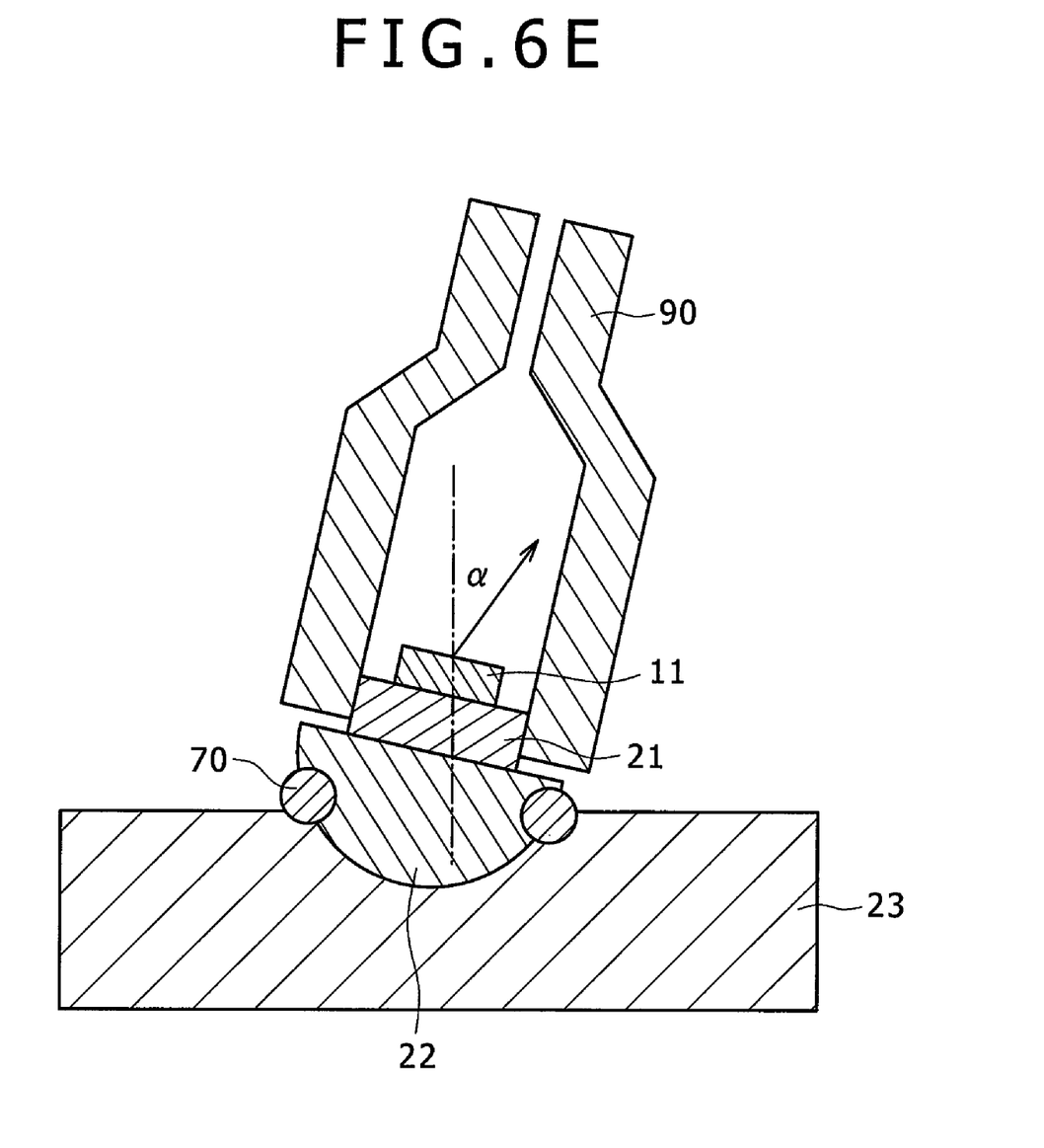
FIG. 6E is a diagram showing a procedure of adjusting the outgoing direction of the light emitting element using the pedestal for mounting the light emitting element according to the embodiment of the present invention.

Then, as shown in FIG. 6E, while the substrate 21 is grasped by the manipulator 90, the pedestal 22 is coated with a UV curable adhesive 70, and irradiated with UV to temporarily fix the pedestal 22 to the base 23. With an aim to remove air bubbles inside of the Ag paste, after vacuum defoaming has been executed on the Ag paste, the UV curable adhesive 70, and the Ag paste being a joining material of the pedestal 22 and the base 23 are thermally cured at the same time to fix the pedestal 22 to the base 23.

In this embodiment, the joining material of the pedestal 22 and the base 23 is Ag paste. However, in the case of using no UV adhesive for temporarily fixing the pedestal 22 and the base 23 together, there is no need to thermally cure the joining material, and the diffusion of compositions of solder may not be taken into consideration. Therefore, solder may be used for the joining material of the pedestal 22 and the base 23. Also, the pedestal is hemispherical in the above embodiment, but it is only necessary to curve the surface of the pedestal so as to be spherical.

Figure 7:
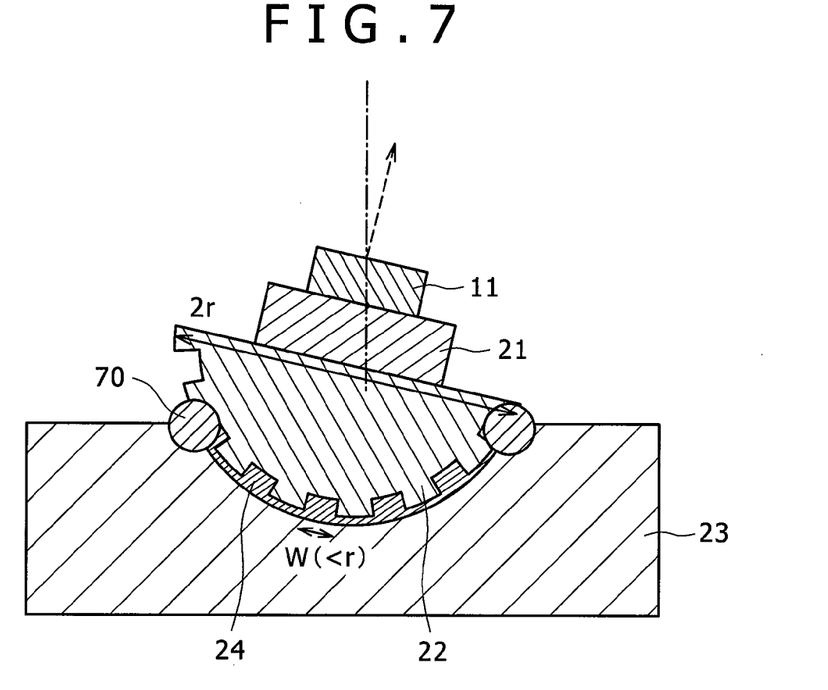
FIG. 7 is a cross-sectional view showing the light emitting element mounted portion according to the embodiment of the present invention.
Figure 8:
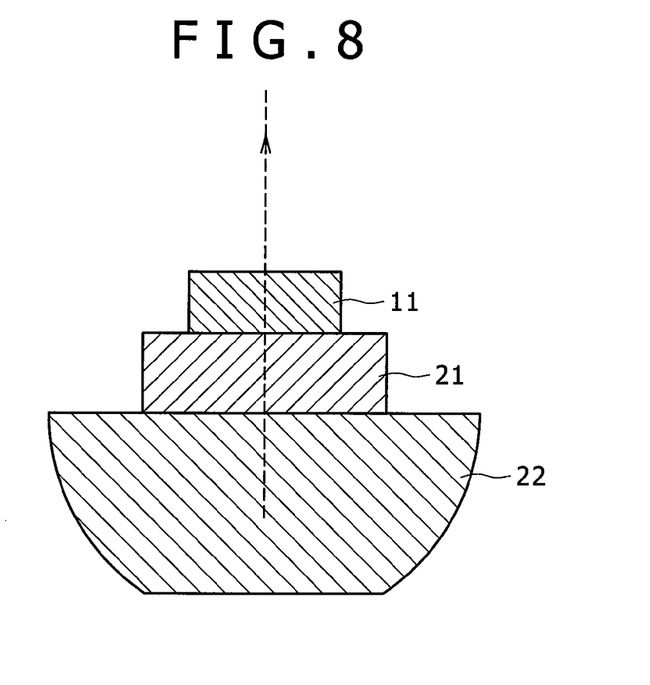
FIG. 8 is a cross-sectional view showing a pedestal for mounting the light emitting element according to the embodiment of the present invention.

An embodiment of the configuration of the pedestal 22 is shown in FIGS. 7 and 8.

FIG. 7 shows the provision of grooves 24 in the hemispheric surface so that the hemispherical surface of the pedestal 22 becomes finned. With the above configuration, the surface area of the pedestal 22 is enlarged. In other words, because an area in which the pedestal 22 is in contact with the Ag paste is larger, the radiation performance can be improved. In addition, when air bubbles are contained in the Ag paste, the provision of the grooves 24 is not desirable because the radiation performance and the connection reliability are deteriorated. In FIG. 7, however, the grooves 24 of the pedestal 22 communicate with the external of the recess in the base 23. This induces a structure in which the air bubbles contained inside of the Ag paste are easily removed to the outside by defoaming.

Also, FIG. 8 shows a configuration in which a part of the hemispherical surface of the pedestal 22 in FIG. 5 is a plane surface. With this configuration, the pedestal 22 can also be put on a plane surface, and there is no need to provide a jig with a recess having the same radius as that of the pedestal 22.

Figure 9:
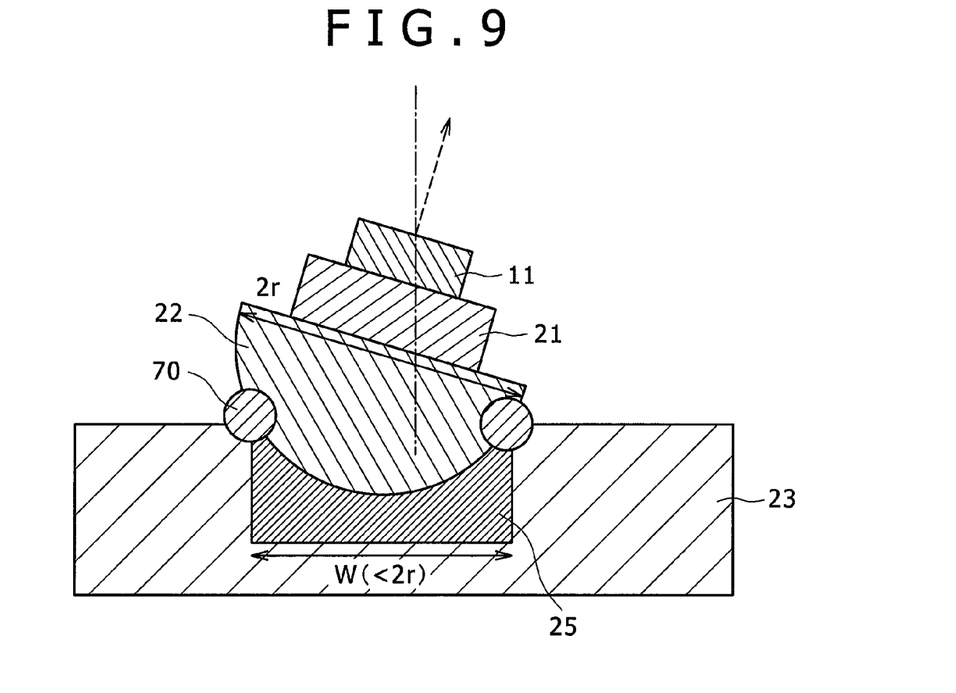
FIG. 9 is a cross-sectional view showing the light emitting element mounted portion according to the embodiment of the present invention.
Figure 10:
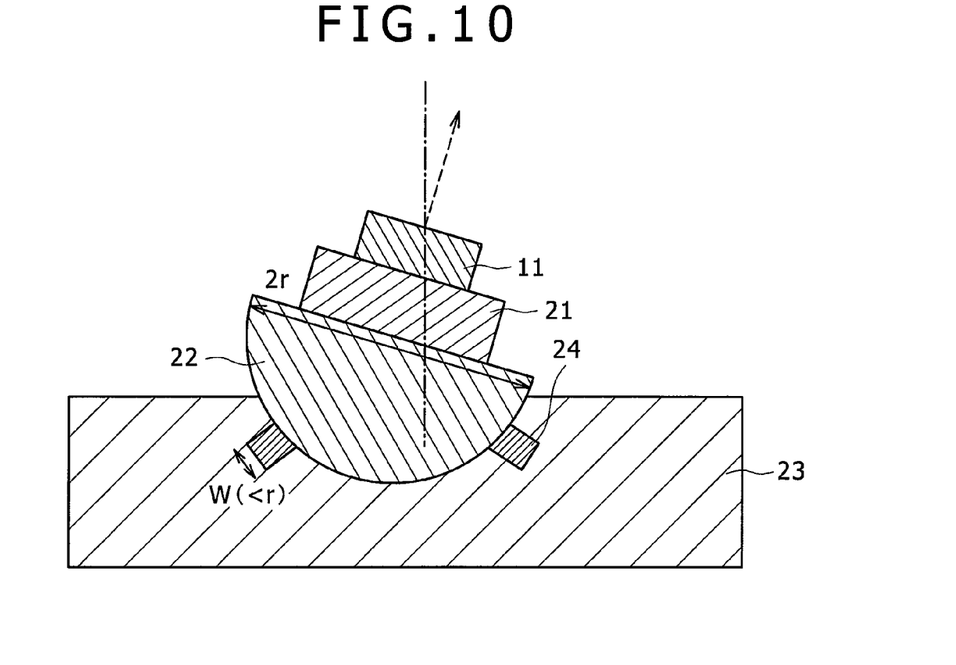
FIG. 10 is a cross-sectional view showing the light emitting element mounted portion according to the embodiment of the present invention.

An embodiment of the configuration of the base 23 is shown in FIGS. 9 and 10.

In FIG. 9, the configuration of the base 23 in FIG. 5 is changed into a configuration having a columnar recess 25. With this configuration, the formation of the recess in the base 23 is easier than the formation of the hemispherical recess. It is assumed that the radius of the hemispherical surface of the pedestal 22 is r, and the diameter of an opening of the recess 25 in the base 23 is W. Then, a relationship of W<2r needs to be satisfied. This is because in the case of W>2r, the pedestal 22 is disposed within the recess 25, and the pedestal 22 cannot be stably fixed (in other words, the hemispherical surface of the pedestal 22 and the base 23 are in point contact).

Also, in FIG. 10, the configuration of the base 23 in FIG. 5 is changed into a configuration having a groove 24 for preventing the base 23 from overflowing with the Ag paste with which the pedestal 22 and the base 23 are joined. When the base 23 overflows with the Ag paste, a gas generated from the Ag paste adheres to a light emitting portion of the light emitting element 11. When the base 23 is provided with the groove 24, and the pedestal 22 and the base 23 are fixed to each other by YAG welding, outgassing from the Ag paste can be reduced while keeping the radiation caused by joining with the Ag paste.

In this embodiment, the recess in the base 23 is of a hemispherical recess having the same radius of curvature as that of the pedestal 22. However, it is only necessary to stably arrange the pedestal 22. More specifically, in the case where the pedestal 22 and the base 23 are joined by YAG welding, when the recess of the base 23 is hemispherical, it is necessary that the radius of curvature of the recess of the base 23 is made smaller than the radius r of the pedestal 22 to provide a portion joined with the YAG welding. Also, when only solder is used for a joining material of the pedestal 22 and the base 23, and the configuration of the recess in the base 23 is hemispherical, it is necessary that the radius of curvature of the recess in the base 23 is made larger than the radius r of the pedestal 22 to provide a point at which the pedestal 22 and the base 23 are in contact with each other.

In the optical module used as a terminal of the wavelength multiplexing optical transmission or the one-core bidirectional optical transmission, which transmits lights of plural wavelengths through one optical fiber, there can be provided an optical module that remarkably reduces the number of optical parts and the number of mounting processes to reduce the size and costs while keeping the low-loss optical characteristic and the high reliability, and a method of manufacturing the optical module.

What is claimed is:

1. An optical transceiver module, comprising:
a housing attachable with an optical fiber;
an optical multiplexer and demultiplexer disposed within the housing;
at least one light emitting element;
a plurality of light receiving elements; and
a base on which the light emitting element and the light receiving elements are mounted, and which is fitted to the housing,
wherein the optical multiplexer and demultiplexer includes a substrate, and a plurality of wavelength selection filters disposed on both surfaces of the substrate,
is disposed substantially parallel to the base, and
outputs a light, which has been input obiiquglv to a main surface thereof, at a position different according to a wavelength of the obliquely input light to the main surface, and
wherein the housing has a recess,
wherein the optical multiplexer and demultipiexer and the base are orthogonal to a wall surface of the recess.
wherein the light emitting element emits a light obliquely to a surface of the base and a main surface of the optical multiplexer and demultiplexer, and
wherein the light receiving elements receive a light obliquely to a surface of the base and a main surface of the optical multiplexer and demultiplexer.

2. The optical multiplexer and receiver module according to claim 1, further comprising a light emitting element mounted substrate on which the light emitting element is mounted,
wherein a surface of the light emitting element mounted substrate on which the light emitting element is mounted is directed obliquely to the surface of the base.

3. The optical multiplexer and receiver module according to claim 1, further comprising a light receiving element mounted substrate on which the light receiving elements are mounted, wherein a surface of the light receiving element mounted substrate on which the light receiving elements are mounted is directed obliquely to the surface of the base.

4. The optical multiplexer and receiver module according to claim 1, further comprising:
a light emitting element mounted substrate on which the light emitting element is mounted; and
a light receiving element mounted substrate on which the light receiving elements are mounted,
wherein a surface of the light emitting element mounted substrate on which the light emitting element is mounted is directed obliquely to the surface of the base, and
wherein a surface of the light receiving element mounted substrate on which the light receiving elements are mounted is directed obliquely to the surface of the base.

5. The optical multiplexer and receiver module according to claim 1,
wherein the wall surface of the recess has a step, and
wherein the optical multiplexer and demultiplexer is fitted to the step.

6. The optical multiplexer and receiver module according to claim 3,
wherein the light emitting element mounted substrate and the light receiving element mounted substrate each include a planar surface on which the light emitting element or the light receiving elements are mounted, and a spherical or columnar surface.

* * * * *